United States Patent
Mourad et al.

(10) Patent No.: US 6,236,175 B1
(45) Date of Patent: May 22, 2001

(54) PROCESS AND DEVICE FOR DETECTING THE SPEED OF ROTATION OF A DC ELECTRIC MOTOR CONTROLLED BY A PWM CONTROL SIGNAL

(75) Inventors: Kamal Mourad, Turin; Luciano Castellar, Grugliasco, both of (IT)

(73) Assignee: Gate S.p.A., Turin (IT)

( * ) Notice: Subject to any disclaimer, the term of this patent is extended or adjusted under 35 U.S.C. 154(b) by 0 days.

(21) Appl. No.: 09/414,774

(22) Filed: Oct. 8, 1999

(30) Foreign Application Priority Data

Oct. 8, 1998 (IT) .............................................. TO98A0848

(51) Int. Cl.[7] ..................................................... H02P 7/29
(52) U.S. Cl. ............................ 318/268; 318/500; 388/811
(58) Field of Search ..................................... 318/268, 293, 318/459, 461, 500; 388/901, 907.2, 909, 928.1, 907.5, 809, 811

(56) References Cited

U.S. PATENT DOCUMENTS

| | | | |
|---|---|---|---|
| 3,708,737 | * | 1/1973 | Johnson ................................ 318/636 |
| 3,818,297 | * | 6/1974 | Ha et al. . |
| 3,976,926 | * | 8/1976 | Egbert . |
| 4,266,168 | * | 5/1981 | Andersen . |
| 4,744,041 | | 5/1988 | Strunk et al. ..................... 318/254 X |
| 5,198,733 | | 3/1993 | Wright ................................. 318/254 |
| 5,811,947 | | 9/1998 | Hurst et al. ......................... 318/370 |
| 5,978,547 | * | 11/1999 | Reynolds et al. .................... 388/811 |

FOREIGN PATENT DOCUMENTS

| | | |
|---|---|---|
| 3830164 | 5/1990 | (DE) . |
| 0543666 | 5/1993 | (EP) . |

* cited by examiner

*Primary Examiner*—Bentsu Ro
(74) *Attorney, Agent, or Firm*—Sughrue, Mion, Zinn, Macpeak & Seas, PLLC

(57) ABSTRACT

The process makes it possible to detect the speed of rotation of a DC electric motor comprised of at least one winding connectable to a DC voltage supply source via an electronic switch with which there is associated a control circuit operable to provide a pulse width modulated square-wave control signal. The process comprises the operation of interrupting the application of the said control system to the electronic switch for a time period of pre-determined duration, acquiring during this time period a signal correlated to the voltage on the said winding and detecting at least one pre-determined characteristic of this signal in dependence on the speed of rotation of the motor.

9 Claims, 4 Drawing Sheets

PROCESS AND DEVICE FOR DETECTING THE SPEED OF ROTATION OF A DC ELECTRIC MOTOR CONTROLLED BY A PWM CONTROL SIGNAL

BACKGROUND OF THE INVENTION

The present invention relates to a process for detecting the speed of rotation of a DC electric motor of the type defined in the introduction to claim 1.

DC electric motors either with or without brushes, controlled with a pulse width modulated (PWM) square wave control signal are widely utilised, for example, on board motor vehicles for various applications such as driving the fan, moving windows and the like.

In such applications PWM controls signals of rather high frequency, for example in the order of 20 KHz are currently used.

In the case of a DC motor having brushes, it is known to detect the speed of rotation, for example for the purpose of regulation, by analysing the current consumed by the motor. This method of detecting the speed of rotation is however rather imprecise and highly influenced by ambient conditions (temperature, supply voltage variations, intrinsic tolerances of the motor etc). Other known arrangements for the detection of the speed of rotation of a DC electric motor involve the use of magnetic sensors (Hall effect sensors, or magnetoresitive sensors) or sensors of optical type. In all cases the adoption of sensors has a detrimental effect due to the inevitable structural complications and the necessary integration of the detector part with the control electronics of the motor, as well as the supplementary costs associated with the use of sensors.

Other known arrangements for detecting the speed of rotation without recourse to the use of sensors involve, in motors having brushes, the so called direct reading of the brushes, that is to say detection and analysis of the ripple in the current consumed during commutation. In the case of motors controlled with PWM signals having a frequency of the order of 10 KHz this technique is problematic to put into practice in that the signal represented by the ripple in the current has much more modest frequency and amplituded dynamics than the frequency and amplitude dynamics of the PWM control signals so that recourse to very sophisticated filters is necessary.

Another known method involves reading the electro motive force (EMF) or counter electromotive force (CEMF). In this case, however, the measurement is strongly influenced by the ambient conditions, and in particular by the temperature.

SUMMARY OF THE INVENTION

The object of the present invention is to make available an improved process for detecting the speed of rotation of a DC electric motor of the type initially defined.

This and other objects are achieved according to the invention by a process for detecting the speed of rotation of a DC electric motor comprising at least one winding connectable to a DC voltage supply source by means of an electronic switch with which is associated a control circuit able to provide a pulse width modulated square wave control signal, the process comprising the operations of interrupting the application of this said control signal to the electronic switch for a time period of pre-determined duration, acquiring during the said time period a signal correlated to the voltage across the said winding, and detecting at least one pre-determined characteristic of the said signal depending on the spread of rotation of the motor.

BRIEF DESCRIPTION OF THE DRAWINGS

Further characteristics and advantages of the invention will become apparent from the following detailed description given purely by way of non-limitative example with reference to the attached drawings, in which.

DETAILED DESCRIPTION OF THE INVENTION

Figure 1:
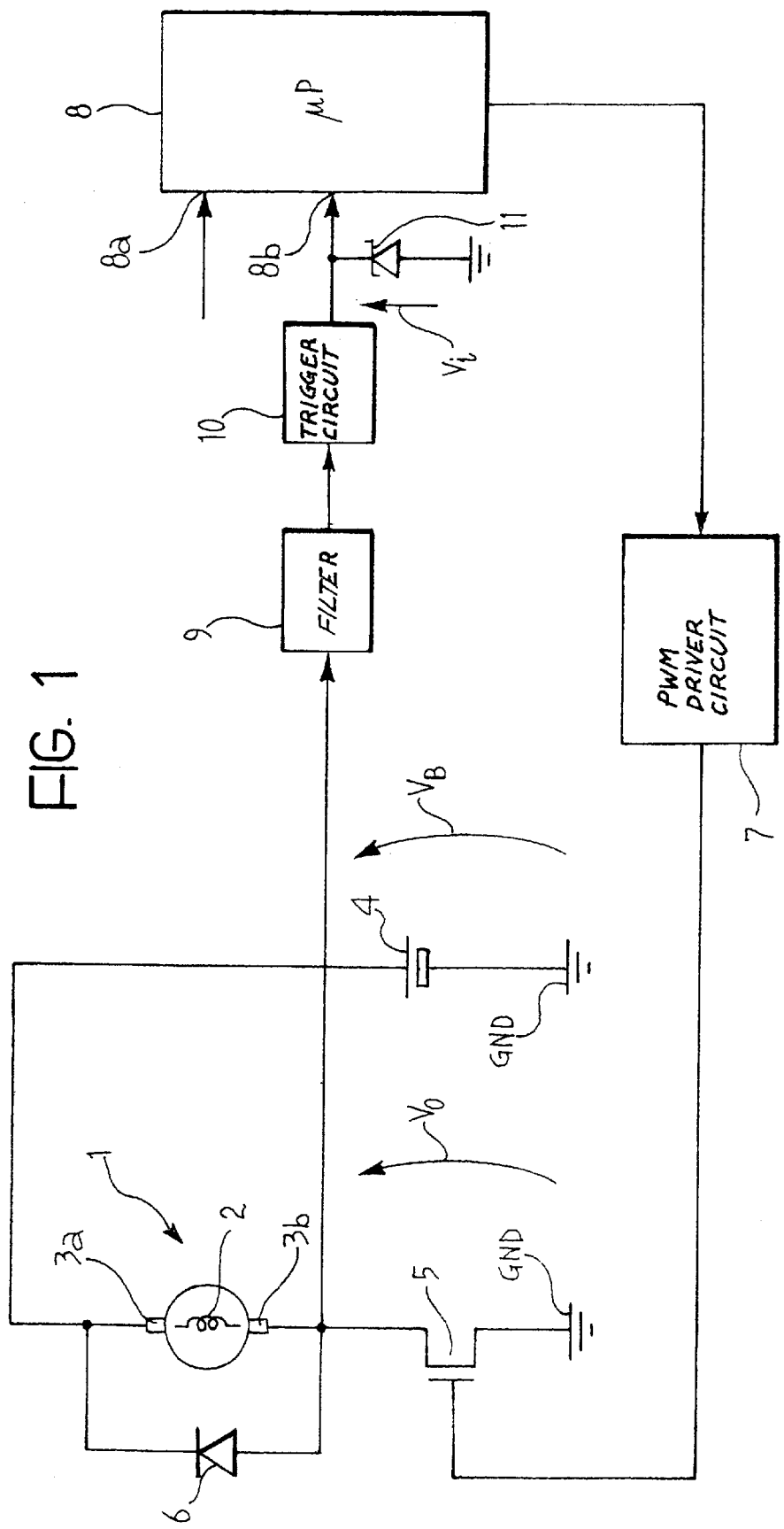
FIG. 1 is a circuit diagram, partially in block diagram form, which shows a DC electric motor of the type having brushes and an associated supply, control and speed regulation circuit performing a process according to the invention.

A DC electric motor generally indicated 1 is shown in FIG. 1 with a rotor winding 2 which can be coupled to two stationary brushes 3a, 3b by means of a segmented commutator of type known per se.

The motor 1 is connected or connectable on one side to a DC voltage source 4, such as an accumulator battery, and on the other side to an electronic switch 5. In the embodiment illustrated the motor 1 is connected to the positive pole of the source 4, the negative pole of which is connected to ground GND, and the electronic switch 5 is a transistor of MOSFET type, having its source connected to ground GND.

In parallel with the motor 1 is connected a recirculation diode 6.

The gate of the electronic switch 5 is connected to the output of a driver circuit 7 operable to provide a pulse width modulated (PWM) square wave control signal to this switch, having a frequency of for example 20 KHz.

The driver circuit 7 in turn receives control signals from the microprocessor control unit 8 which receives at its input 8a a signal indicative of the desired nominal speed of rotation of the motor 1.

The drain of the electronic switch 5 is connected to the input of a filter 9 the output of which is connected to the input of a trigger circuit 10. The output of this latter is connected to a further input 8b of the control unit 8. Between the output of the trigger circuit 10 and ground is disposed a zener diode 11 acting as a voltage limiter.

The input 8b of the control unit 8 acts as an input for the acquisition of a signal from which the effective speed of rotation of the electric motor 1 can be deduced using the method according to the invention which will be further described hereinafter.

The microprocessor control unit 8 operates in the following manner.

On the basis of the required nominal speed of rotation of the motor 1, indicated by the signal provided at the input 8a, the unit 8 provides the driver circuit 7 with control signals acting to make the duty cycle of the signal applied to the gate of the electronic switch 5 correspond to this desired speed.

Figure 2:
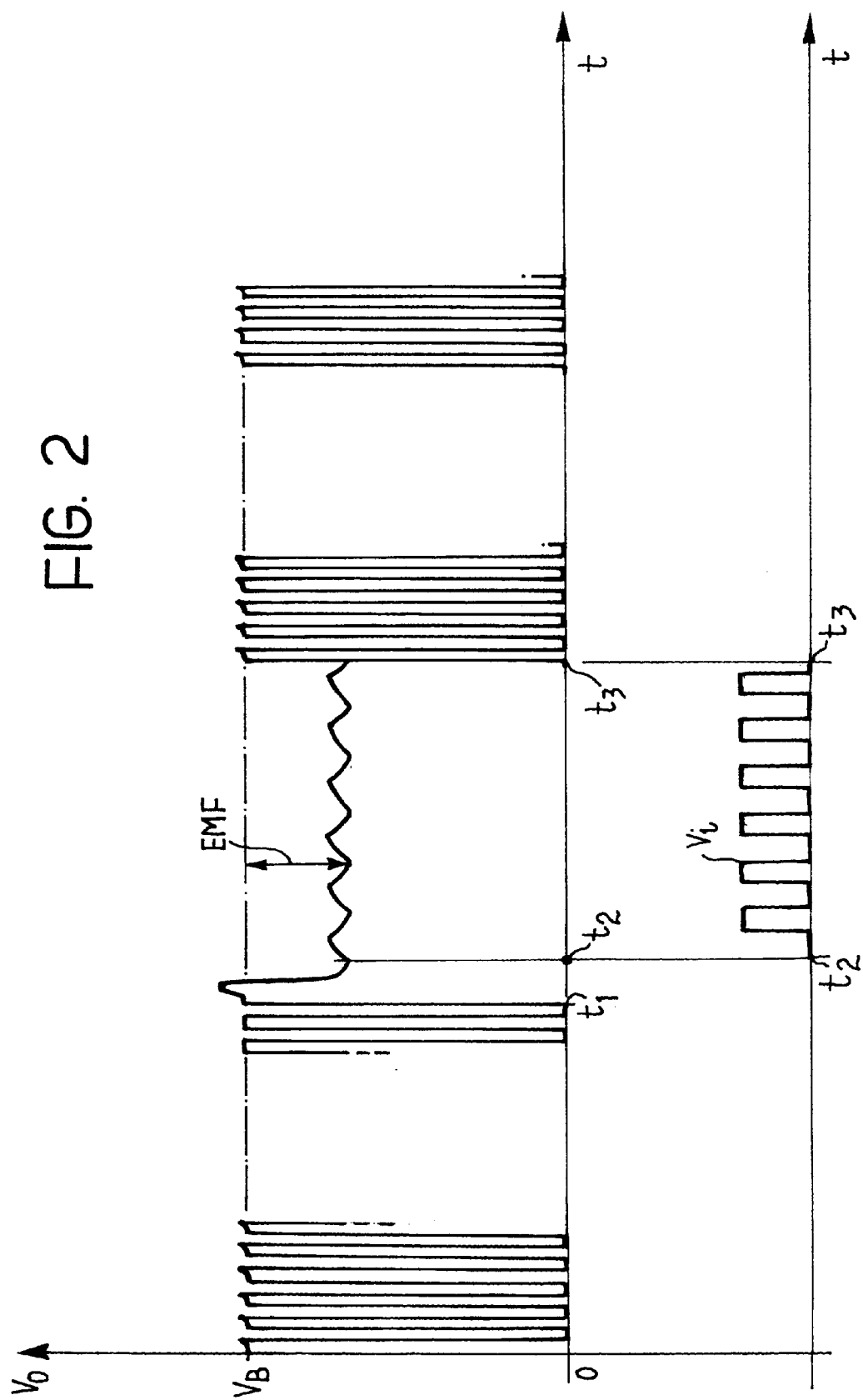
FIG. 2 is a series of graphs which show the qualitative variation, as a function of time t plotted on the abscissa, of signals in the circuit of FIG. 1.

The voltage $V_0$ between the drain of the electronic switch 5 and ground now has a qualitative variation illustrated in the left hand part of the upper graph of FIG. 2. The voltage $V_0$ has a square wave variation between a maximum value substantially corresponding to the voltage $V_B$ delivered from the source 4, and a substantially nil value (if the voltage drop across the electronic switch 5 when it is conductive is neglected).

The electronic unit 8 is set up to detect periodically the effective speed of rotation of the motor 1 by periodically interrupting the application of the PWM control signal to the gate of the electronic switch 5. Upon the occurrence of such an interruption, as illustrated by way of an example at instant $t_1$ in FIG. 2, the voltage $V_0$ initially has a transient variation with a (modest) over voltage peak substantially equal to the forward conduction voltage of the recirculation diode 6, followed by a descent to a level which is on average lower then the voltage VB (in FIG. 2, for clarity, the time scale between $t_1$ and $t_2$ has been expanded). Once this initial transient has decayed, whilst the application of the control signal to the input of the switch 5 remains interrupted (time interval between $t_2$ and $t_3$ in FIG. 2) the voltage $V_0$ has an average value equal to the difference between the voltage $V_B$ delivered by the source 4 and the electromotive force EMF developed across the winding 2 of the electric motor 1. In particular, between the instants $t_2$ and $t_3$ the variation of the voltage $V_0$ has a marked ripple corresponding to the ripple of the electromotive force EMF due to the switching of contacts between the brushes and the segments of the commutator of the electric motor 1. This ripple in the voltage $V_0$ has a frequency distinctly less than that of the PWM control signal applied to the gate of the electronic switch 5 and is for example of the order of some hundred Hz.

The frequency of the ripple in the signal $V_0$, in the time interval $t_3-t_2$, is proportional to the speed of rotation of the electric motor 1. Therefore, the signal $V_0$, after passage though the filter 9, can be squared by means of the trigger circuit 10 so as to obtain a corresponding frequency signal, indicated $V_i$ in the lower graph of FIG. 2. The signal $V_i$ is applied to the input 8b of the microprocessor control unit 8. This latter is set up to determine the effective speed of rotation of the electric motor 1 on the basis of the frequency of the signal $V_i$.

Then, at the instant indicated $t_3$ in FIG. 2 the control unit 8 resumes application of the PWM control signal to the control input or gate of the electronic switch 5.

The time period $t_3-t_1$ for which the control signal applied to the electronic switch 5 has been interrupted must evidently be sufficiently long to allow both the decay of the initial transient associated the recirculation of the motor current in the diode 6 (interval $t_2-t_1$) and the "reading" of a certain number of commutations of the voltage $V_0$, for a reliable acquisition of the speed of rotation. The interval for which the PWM control signal is interrupted must, however, not be excessively long in order to avoid an appreciable slowing of the motor, the generation of acoustic noise and a high ripple in the current which is consumed from the voltage source upon re-triggering of the switch 5. This ripple can influence other devices connected to the same voltage source.

With motors of the usual type, the initial transient (interval $t_2-t_1$) generally decays in a maximum time less than 1 ms. Moreover, from tests performed by the applicant, the interruption of the PWM control signal for a time period $(t_3-t_1)$ equal to 40 ms is absolutely acceptable both from the point of view of the speed of rotation of the motor and from the acoustic point of view and that of generated current ripple.

The periodic interruption or 'extinguishing' of the control signal applied to the electronic switch 5 thus allows the effective speed of rotation of the electric motor to be detected easily in an reliable and precise manner. Conveniently, the control unit 8 is arranged to perform successive interruptions of the PWM control signal, with a repetition frequency which is preferably not constant, but rather is random, so as to make the acoustic effects of such repeated interruptions absolutely imperceptible.

The arrangements described above with reference to FIG. 1 envisages that the effective speed of rotation of the electric motor is detected by detecting the frequency of the ripple in the signal $V_0$ or rather by counting its oscillations in a pre-determined time period.

Figure 3:
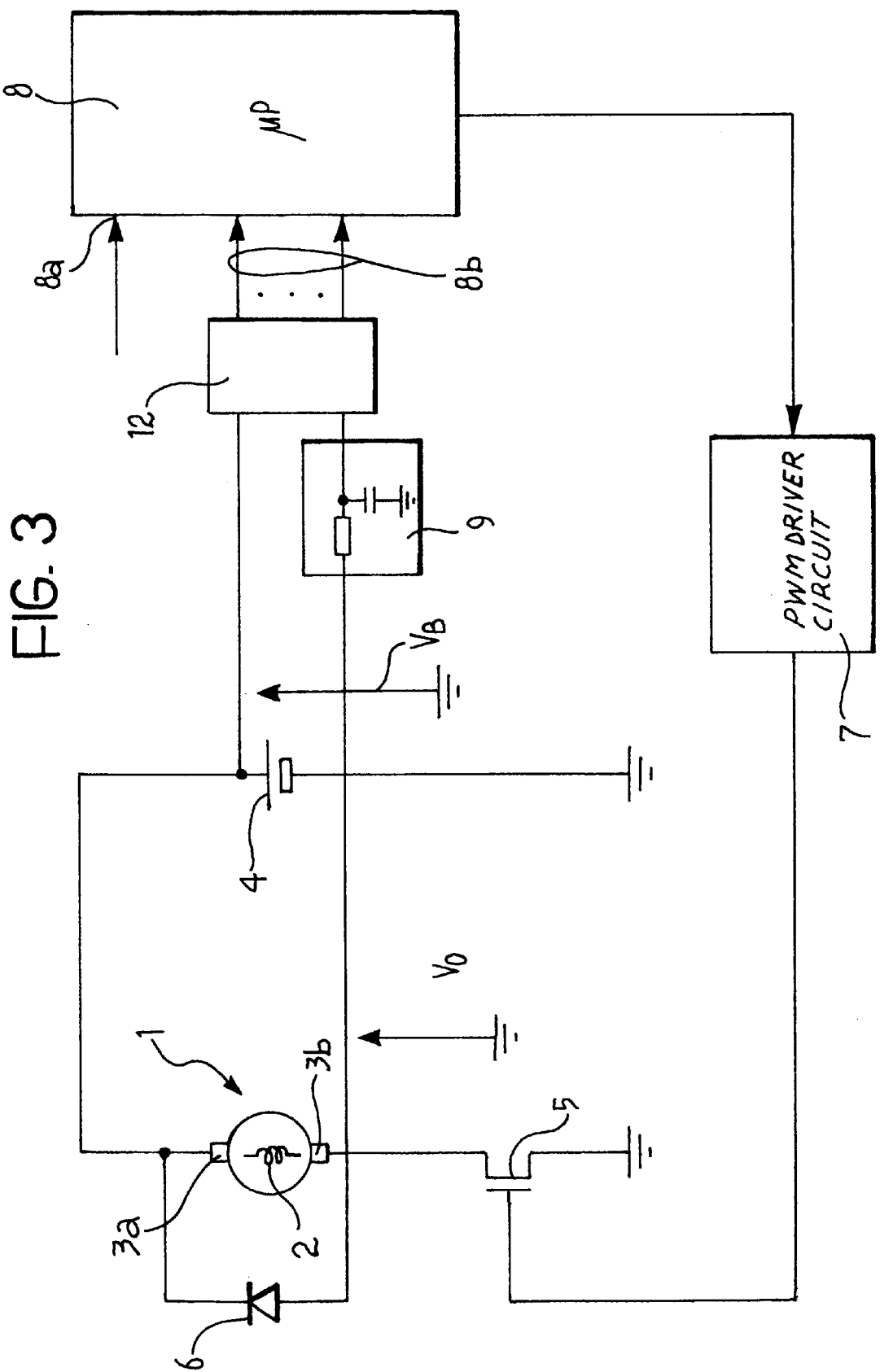
FIG. 3 shows a variant embodiment of the circuit of FIG. 1.

In FIG. 3 there is shown a variant embodiment which will now be described. In this Figure those parts and elements already described have again been allocated the same alphanumeric references.

In the variant according to FIG. 3 the detection of the effective speed of rotation of the electric motor 1 is again effected during the course of an interruption of the PWM control signal applied to the gate of the electronic switch 5. However, this is based on the fact that after the initial transient (interval $t_2-t_1$ of FIG. 2) the average value of the voltage $V_0$ in the interval $t_3-t_2$ is uniquely correlated to the effective speed of rotation of the motor. In effect, in this time interval, the average value of the $V_0$ is equal to the difference between the voltage $V_B$ generated by the source 4 and the average electromotive force EMF developed across the winding 2 of the motor. This latter is substantially proportional (according to a non-linear law) to the effective speed of rotation of the motor.

In the arrangement according to FIG. 3, the drain of the electronic switch 5 is thus connected to the input of the first section of an analogue-to-digital converter 12 via a filter 9. The positive pole of the source 4 is moreover connected to a second section of the converter 12. This latter provides a series of inputs 8b of the micro-processor control unit 8 with digital signals indicative of the instantaneous value of the voltage $V_B$ and the signal $V_0$. The control unit 8 is set up to derive, on the basis of the signals, the average value of the electromotive force EMF, and to deduce from this the effective speed of rotation of the motor.

As far as the duration of the time period $t_3-t_1$ for which the PWM control signal is interrupted is concerned, the same considerations already explained in relation to the embodiment of FIG. 1 are also true for the embodiment of FIG. 3.

The embodiment of FIG. 1 ensures a good precision in the detection of the speed, in particular when this speed is high, whilst the embodiment of FIG. 3 is able to allow a good precision of detection in particular at low speeds.

In view of the above, in a further embodiment not illustrated in the drawings, both the arrangement according to FIG. 1 and that according to FIG. 3 can be implemented and the microprocessor control unit 8 can be conveniently arranged to determine the speed of rotation of the motor using the first arrangement when the required or nominal speed of rotation of the motor is greater than a pre-determined value, and according to the second arrangement when the required or nominal speed is less than the said pre-determined value.

Figure 4:
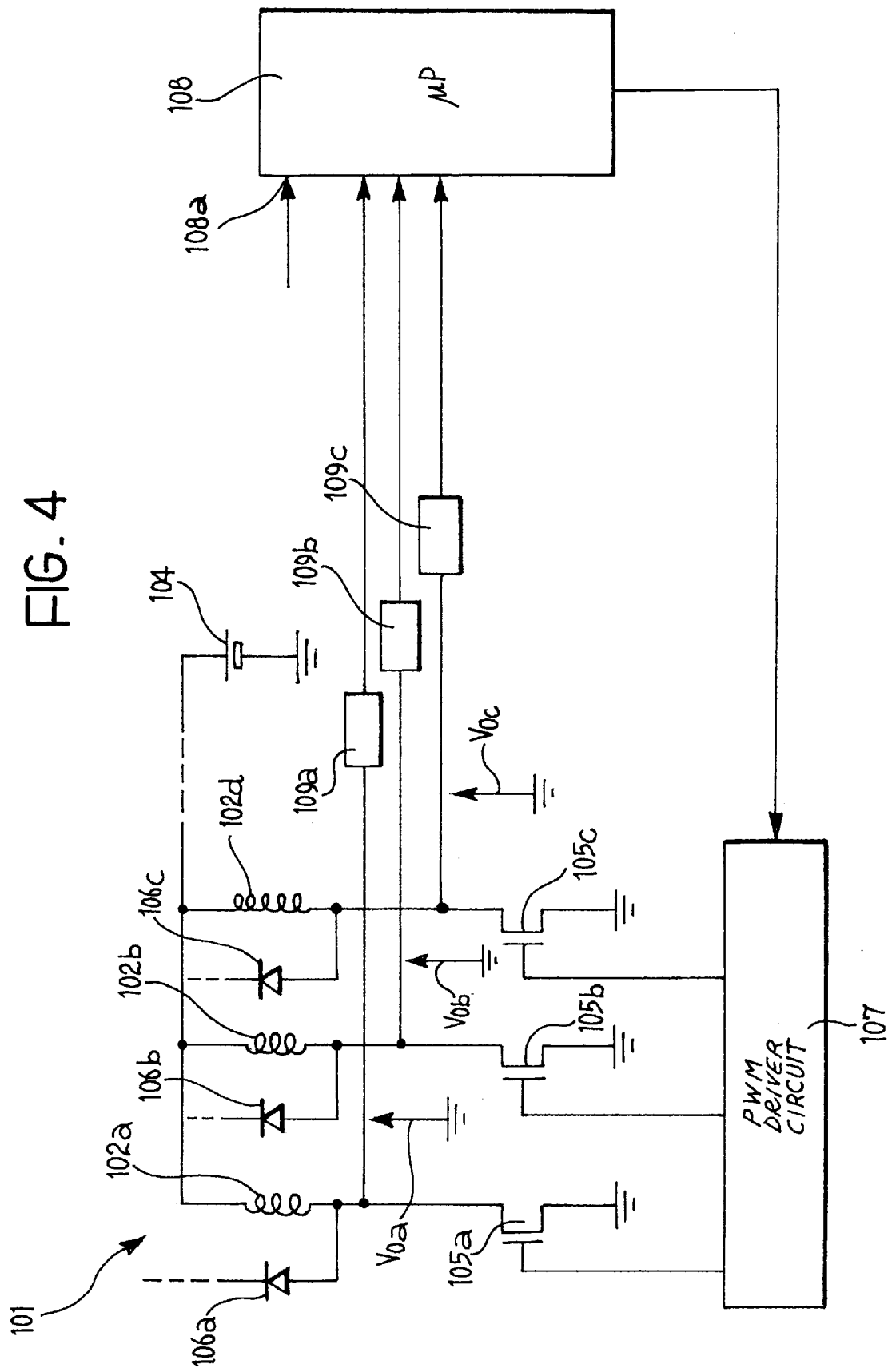
FIG. 4 shows a brushless motor and an associated supply, control and monitoring circuit according to the invention.

In FIG. 4 there is shown a circuit diagram detecting the speed and/or position of a DC motor of brushless type. In the arrangement illustrated in this Figure the brushless motor is a three phase half-wave motor with permanent magnet rotor (not illustrated). The brushless motor 101 of FIG. 4 has three stator windings or phases 102a, 102b, 102c all connected or connectable between the positive pole of a DC voltage supply source 104 and respective electronic control switches 105a, 105b, 105c. These latter may also be MOSFET transistors in this case.

The control inputs or gates of the electronic switches associated with the phases of the motor 101 are connected to corresponding outputs of a driver circuit 107 capable of providing their respective pulse width modulated (PWM) square wave control signals. The circuit driver 107 is controlled by a microprocessor control unit 108 which receives at an input 108a a signal indicative of the nominal required speed of rotation of the motor.

The drains of the electronic switches 105a, 105b, 105c are connected, via respective filters 109a, 109b, 109c to corresponding inputs of the control unit 108. This latter is arranged to interrupt the application of the control signal to the gate of each switch 105a, 105b, 105c for a respective time period of pre-determined duration during which a respective signal $V_{0a}$, $V_{0b}$, $V_{0c}$ is acquired correlated to the voltage on the corresponding stator winding or phase of the motor 101. The signals $V_{0a}$, $V_{0b}$, $V_{0c}$ are in particular representative of the induced electro magnetic forces in the corresponding winding or phase 102a, 102b, 102c of the motor. The control unit 108 is arranged to detect the sign of these electromotive forces and to determine, on the basis of this sign the speed and/or position of the rotor of the motor.

The detection of the speed of rotation of a DC electric motor according to the invention has such precision characteristics as to allow the control system associated with the motor to prevent this latter from rotating at certain speed values at which mechanical resonance phenomena can arise.

Naturally, the principle of the invention remaining the same, the embodiments and details of the construction can be widely varied with respect to those which have been described and illustrated purely by way of non-limitative example, without by this departing from the invention as defined in the attached claims.

What is claimed is:

1. A process for detecting the speed of rotation of a DC electric motor comprising at least one winding connectable to a DC voltage supply source by means of an electronic switch with which is associated a control circuit able to provide a pulse width modulated square wave control signal, the process comprising the operations of interrupting the application of said control signal to the electronic switch for a time period of pre-determined duration, acquiring during the time period a signal correlated to the voltage across said winding, and detecting at least one pre-determined characteristic of said signal depending on the speed of rotation of the motor, wherein the application of said control signal to the switch is interrupted at plurality of times at a repetition frequency which is substantially random.

2. A process according to claim 1, wherein the characteristic is detected in a time interval which lies in the interruption period of the said control signal, and which starts after a pre-determined delay with respect to the interruption of the control signal.

3. A process according to claim 1, for detecting the speed of rotation of an electric motor the rotor of which is provided with a segmented commutator with which there are associated brushes connected to the voltage source and, respectively, to the electronic switch;

wherein said signal is correlated to the voltage between the said brushes.

4. A process according to claim 3, wherein the detected characteristic of said signal is substantially the frequency of the ripple of the voltage due to the switching of the contact between brushes and the segments of the commutator.

5. A process according to claim 3, wherein the detected characteristic of said signal is substantially the average value of the voltage.

6. A process according to claim 3, for detecting the effective speed of rotation of a motor with which is associated a speed control system operable to control said electronic switch with a PWM control signal the pulse width of which corresponds to a desired nominal speed of rotation of the motor;

wherein when the nominal speed of rotation is greater and, respectively, less than a pre-determined value, the detected characteristic is the frequency of the ripple of the signal due to the contact switching between the brushes and the segments of the commutator and, respectively, the average value of said voltage.

7. A process according to claim 1, for detecting the speed and/or the angular position of the rotor of a permanent magnet brushless electric motor comprising a plurality of stator windings or phases each of which is selectively connectable to a DC voltage supply source via a respective electronic switch controlled with a pulse width modulated square-wave control signal;

wherein the application of the control signal to each switch is interrupted for a respective time period of pre-determined duration, during which there is acquired a signal correlated to the voltage across the corresponding winding or phase of the motor, and at least one pre-determined characteristic of said signal dependent on the speed and/or the angular position of the rotor of the motor is detected.

8. A process according to claim 7, wherein said signal is representative of the electromotive force induced in the stator winding or phase and the sign of said electromotive force is detected.

9. A device for performing the process of claim 1, comprising:

control means operable to cause interruption in the application of said control signal to the electronic switch for a time period of pre-determined duration, acquisition means operable to allow the acquisition, during said time period of a signal correlated to the voltage across said winding, and detector means operable to detect at least one pre-determined characteristic of said signal dependent on the speed of rotation of the motor.

* * * * *